H. L. De Leng,
Bullet Mold.
No. 190. A. I. Patented Feb. 16, 1858.
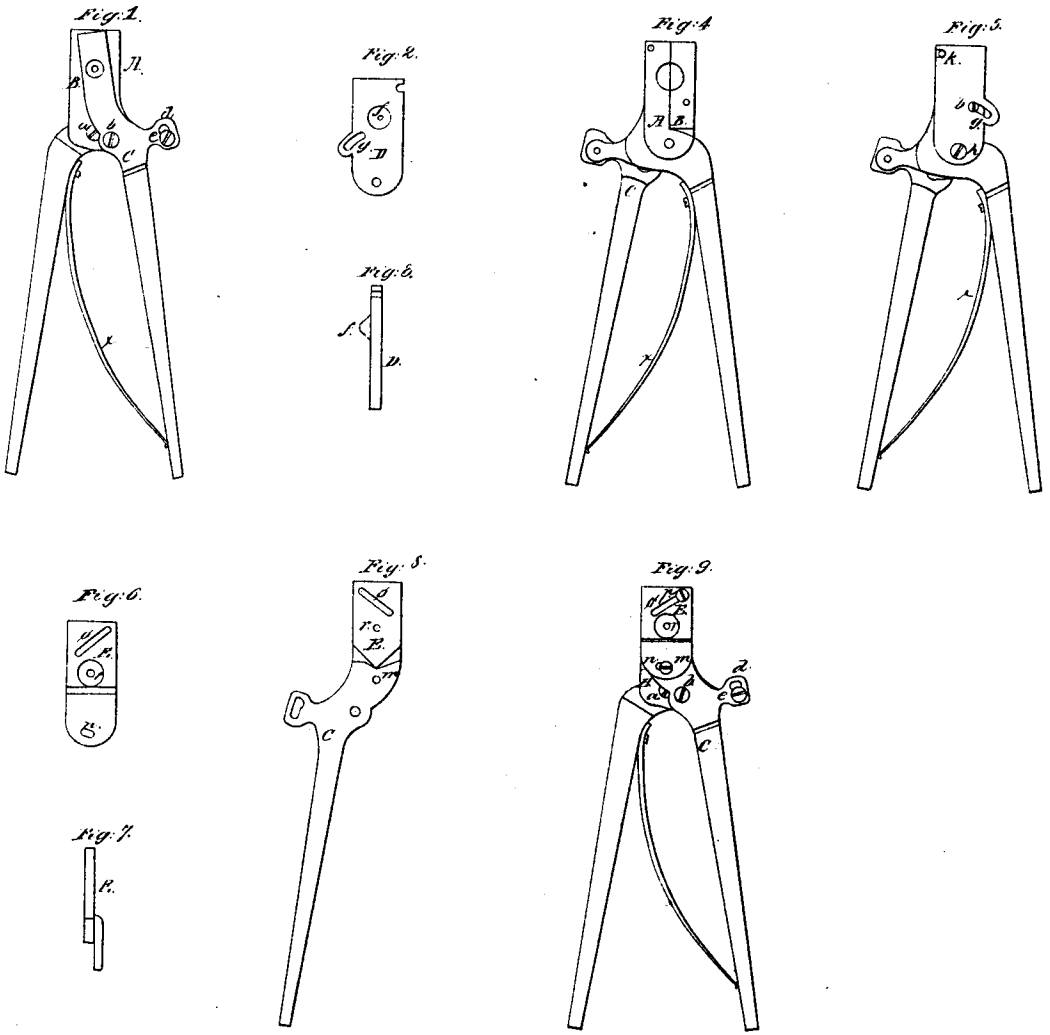
Witnesses:
G. A. Sewards
Saml. D. Cartelfore
Inventor:
Henry L. De Leng
N. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 190 FOR THE ISSUE DATE 02/16/1858 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims